(12) United States Patent
Hino

(10) Patent No.: US 6,288,793 B1
(45) Date of Patent: Sep. 11, 2001

(54) PRINTER CONTROLLING APPARATUS AND METHOD AND RECORDING MEDIUM FOR RECORDING PROGRAM CODE FOR EXECUTING THE SAME

(75) Inventor: Yasuhiro Hino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/123,333

(22) Filed: Jul. 28, 1998

Related U.S. Application Data

(62) Division of application No. 08/678,482, filed on Jul. 9, 1996, now Pat. No. 5,832,192.

(30) Foreign Application Priority Data

Jul. 14, 1995 (JP) .................................................. 7-178710

(51) Int. Cl.[7] .............................. B41B 15/00; G06F 15/00
(52) U.S. Cl. .......................... 358/1.18; 358/1.3; 358/1.16; 358/1.17
(58) Field of Search ........................... 358/1.1, 1.3, 1.13, 358/1.14, 1.15, 1.16, 1.17, 1.18, 450; 347/111, 142

(56) References Cited

U.S. PATENT DOCUMENTS

| 5,050,098 | 9/1991 | Brown, III et al. ................. 395/114 |
| 5,136,688 | * 8/1992 | Morikawa et al. ................. 358/1.16 |
| 5,216,754 | * 6/1993 | Saithi et al. ........................ 358/1.14 |
| 5,471,564 | 11/1995 | Dennis et al. ....................... 395/114 |

FOREIGN PATENT DOCUMENTS

| 9312501 | 6/1993 | (WO) . |
| 9502224 | 1/1995 | (WO) . |

* cited by examiner

Primary Examiner—Edward Coles
Assistant Examiner—Twyler Lamb
(74) Attorney, Agent, or Firm—Fitzpatrick, Cella, Harper & Scinto

(57) ABSTRACT

A plurality of plotting data generated for image output by an application program of a host computer are subjected to buffering; it is determined whether or not the plurality of buffered plotting data can be described by a smaller number of plotting data; and, when determined as capable of being described by a smaller number of plotting data, the plurality of buffered plotting data are converted into a smaller number of plotting data.

16 Claims, 15 Drawing Sheets

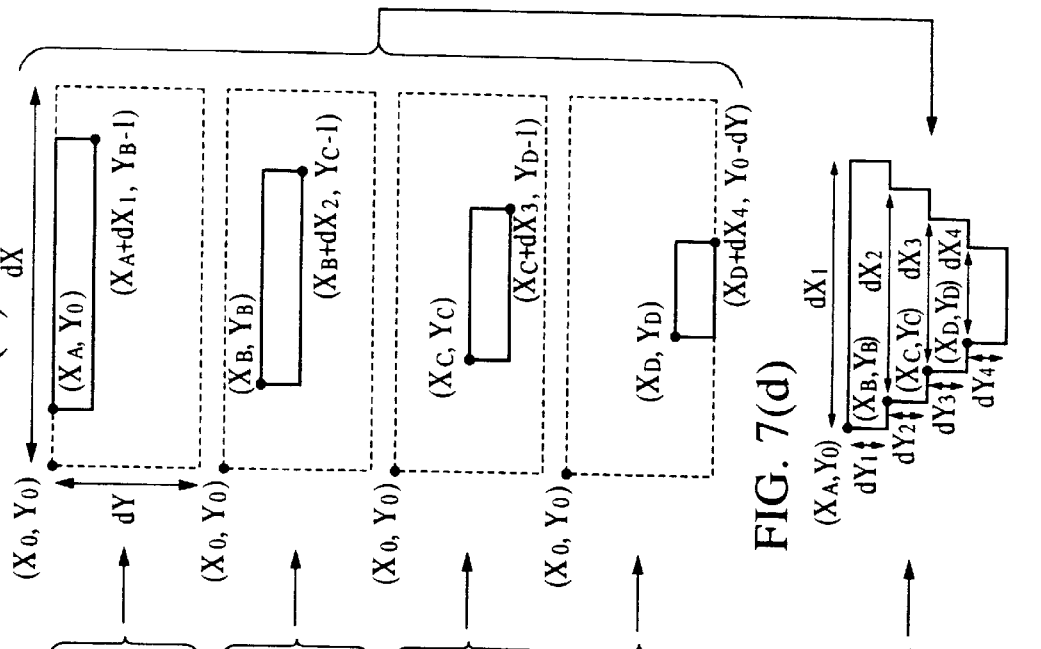
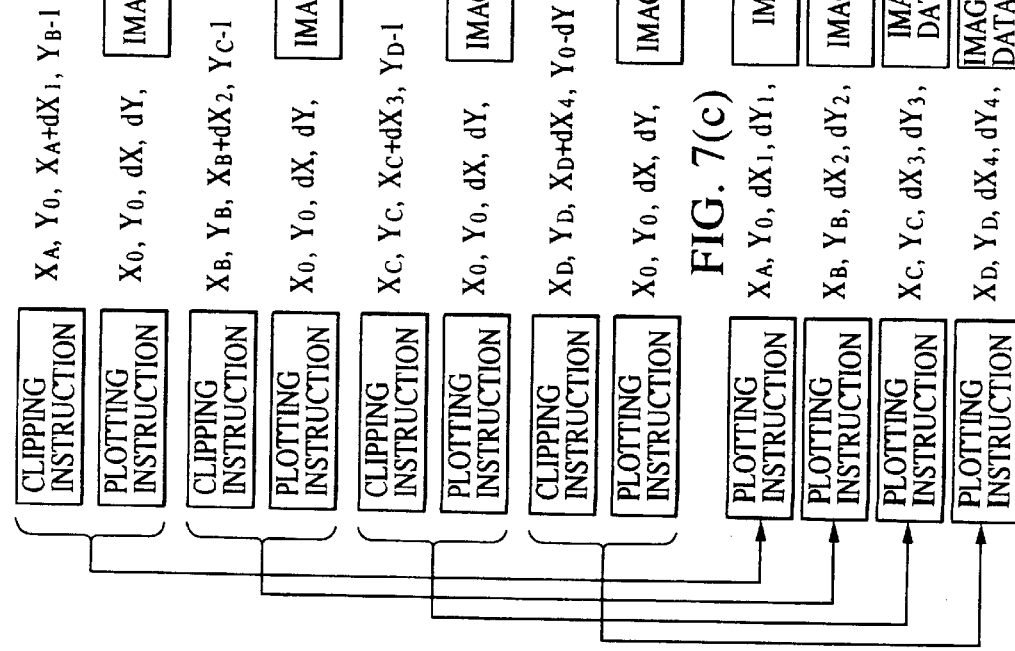

| FIG. 9A |
| FIG. 9B |

| FIG. 11A |
| FIG. 11B |

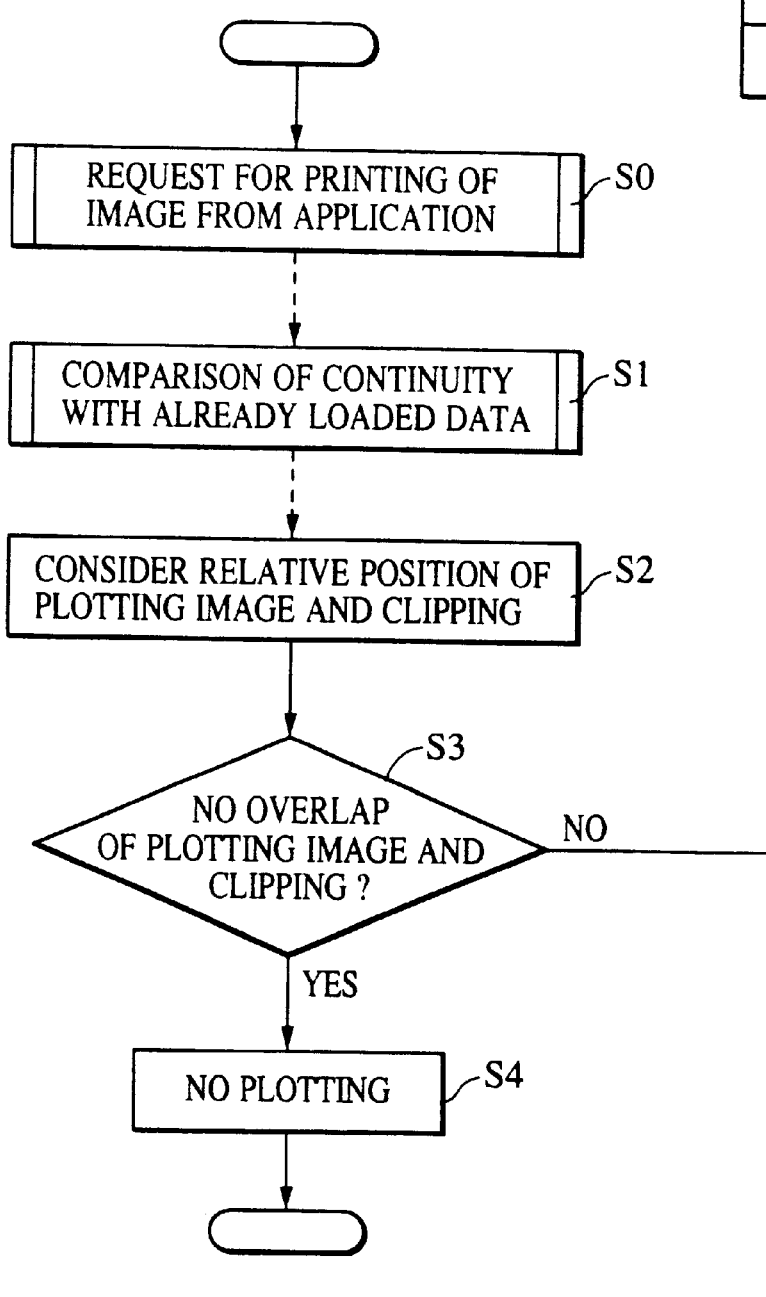

PRINTER CONTROLLING APPARATUS AND METHOD AND RECORDING MEDIUM FOR RECORDING PROGRAM CODE FOR EXECUTING THE SAME

THIS APPLICATION IS A DIV OF 08/678,482, filed Jul. 9, 1996, issued Nov. 3, 1998 U.S. Pat. No. 5,832,192.

BACKGROUND OF THE INVENTION

1. Field of the Invention

The present invention relates to printer controlling apparatus and methods for processing print data generated for print output for example by an application program of a host computer and also relates to a recording medium for recording a program code for executing the same.

2. Description of the Related Art

Usually, when a document prepared by using an application program is to be printed, a printer driver is driven in accordance with a printing procedure of the application. The printer driver converts the print data into a print command by the driven procedure and transmits it to a printer apparatus. Upon receiving the print command, the printer apparatus sequentially analyzes and executes the received command.

However, the printing procedure of an application program is a characteristic of the application. Some of the newly developed applications with high-level functions are designed to repeat the same plotting process again and again or to divide a figure consisting of a large block into small parts or to combine an enormous number of figures to print an area which will, after all, be plotted as a small figure.

Such print data not only increases the amount of data to be transmitted but also results in a problem that, considering only the printed result, an unnaturally long time period is required due to the fact that the apparatus for processing such data is also greatly loaded.

Furthermore, since only a minimized amount of memory is commonly mounted on a printer apparatus because of a limitation of costs, the plotting operation may become impossible due to a shortage of memory that is necessary to process the plotting data when a great amount of plotting data as described is to be processed.

SUMMARY OF THE INVENTION

Accordingly, it is an object of the present invention to provide a printer controlling apparatus and method and a recording medium for recording a program code for executing the same with which the above described problems are solved so that, even when plotting data with a high level of redundancy is generated by an application program to be utilized, it is possible to prevent a requirement for long time period until its output or an occurrence of impossibility of plotting.

To achieve the above object, an image processing apparatus is provided in accordance with the present invention, having a printer control apparatus for processing print data generated for print output by an application program of a host computer, comprising: buffer means for buffering a plurality of plotting data generated by said application; and optimization means for arranging the plurality of plotting data buffered in said buffer means into a single data.

Further, an image processing method according to the present invention includes the steps of: buffering a plurality of plotting data generated by an application program of a host computer; determining whether the plurality of buffered plotting data can be described by one plotting data; and, when determined as capable of being described by one plotting data, converting the plurality of buffered plotting data into one plotting data.

Furthermore, a recording medium according to the present invention stores a program code readable by a computer, said program code comprising:

means for buffering a plurality of plotting data generated for print output by an application program; and optimization means for converting the plurality of buffered plotting data into one plotting data.

Other objects and advantages of the present invention will be more apparent from the accompanying drawings, claims and detailed description below.

BRIEF DESCRIPTION OF THE DRAWINGS

FIG. 7 illustrates an example of optimization of plotting data.

DESCRIPTION OF THE PREFERRED EMBODIMENTS

Some preferred embodiments of the present invention will be described below in detail with reference to the accompanying drawings.

Before describing the construction of the present invention, the construction of a laser beam printer (hereinafter referred to as "LBP") to which the present invention may be suitably applied will be described below with reference to FIG. 1. It should be noted that, naturally, the printer to which the present invention is applied is not limited to a laser beam printer and printers using other printing methods may be used.

Figure 1:
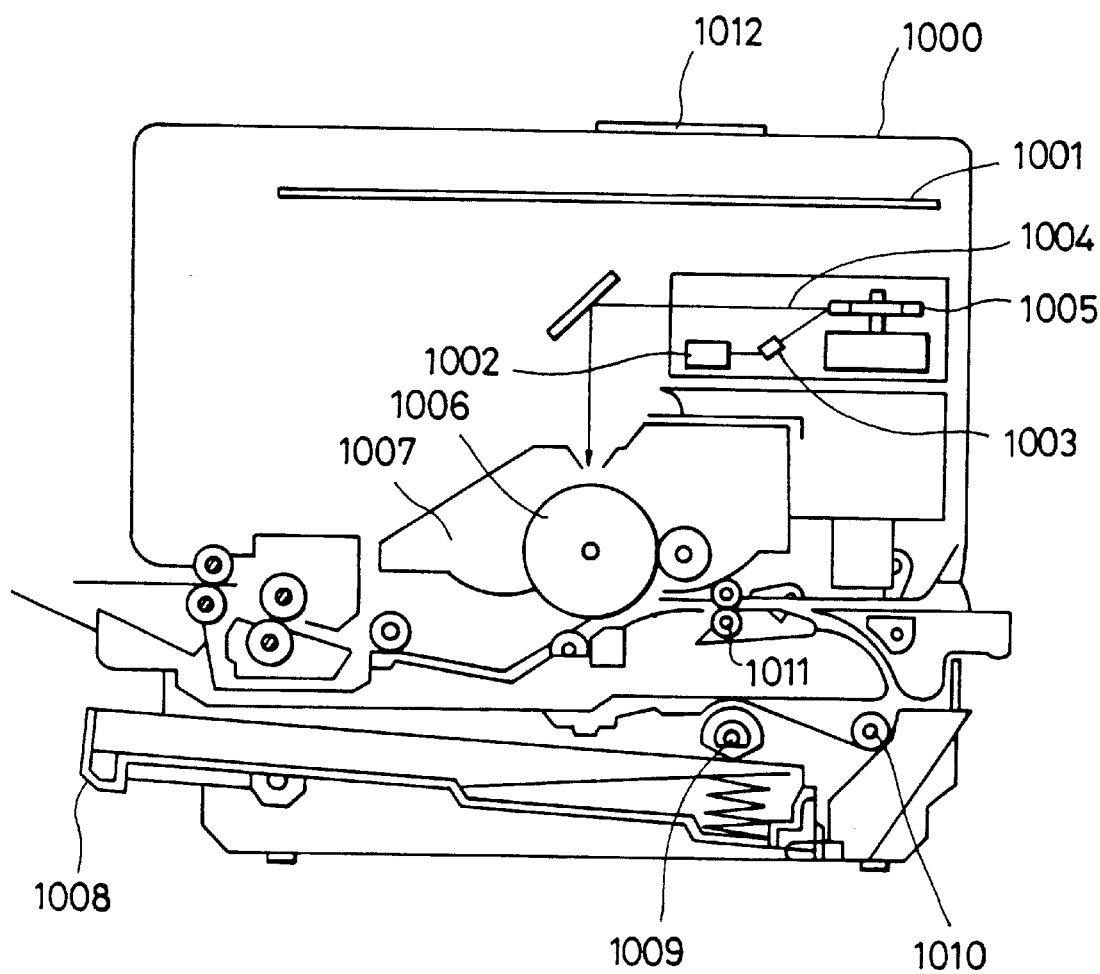
FIG. 1 is a side sectional view showing the construction of a laser beam printer of Embodiment 1.

FIG. 1 is a sectional view showing the internal structure of a laser beam printer suitable for the present embodiment. Referring to FIG. 1, what is denoted by numeral 1000 is the body of a LBP which receives and stores character information (character code) and form information or macro commands supplied from a host computer externally connected thereto and produces corresponding character patterns, form patterns or the like in accordance with these informations to form an image on a recording sheet. An operation panel 1012 is provided with switches for operation, LED indicators, etc., disposed thereon and a printer control unit 1001 controls the LBP 1000 as a whole and analyzes character information or the like supplied from the host computer. The control unit 1001 mainly converts a character information into a video signal of corresponding character pattern and outputs it to a laser driver 1002. The laser driver 1002 is a circuit for driving a semiconductor laser 1003 and effects ON/OFF switching of a laser beam 1004 emitted from the semiconductor laser 1003 in accordance with the input video signal. The laser 1004 is deflected in a left and right direction by a rotary polygon mirror 1005 and scans over an electrostatic drum 1006. An electrostatic latent image of the character pattern is thereby formed on the electrostatic drum 1006. This latent image is transferred onto the recording paper after its being developed by a developing unit 1007 provided around the electrostatic drum 1006. A cut sheet is used as the recording paper. The cut sheet recording paper is set in a paper cassette 1008 mounted on the LBP and is taken into the apparatus by a feeding roller 1009 and carrier rollers 1010 and 1011 so as to be sent to the electrostatic drum 1006.

Figure 2:
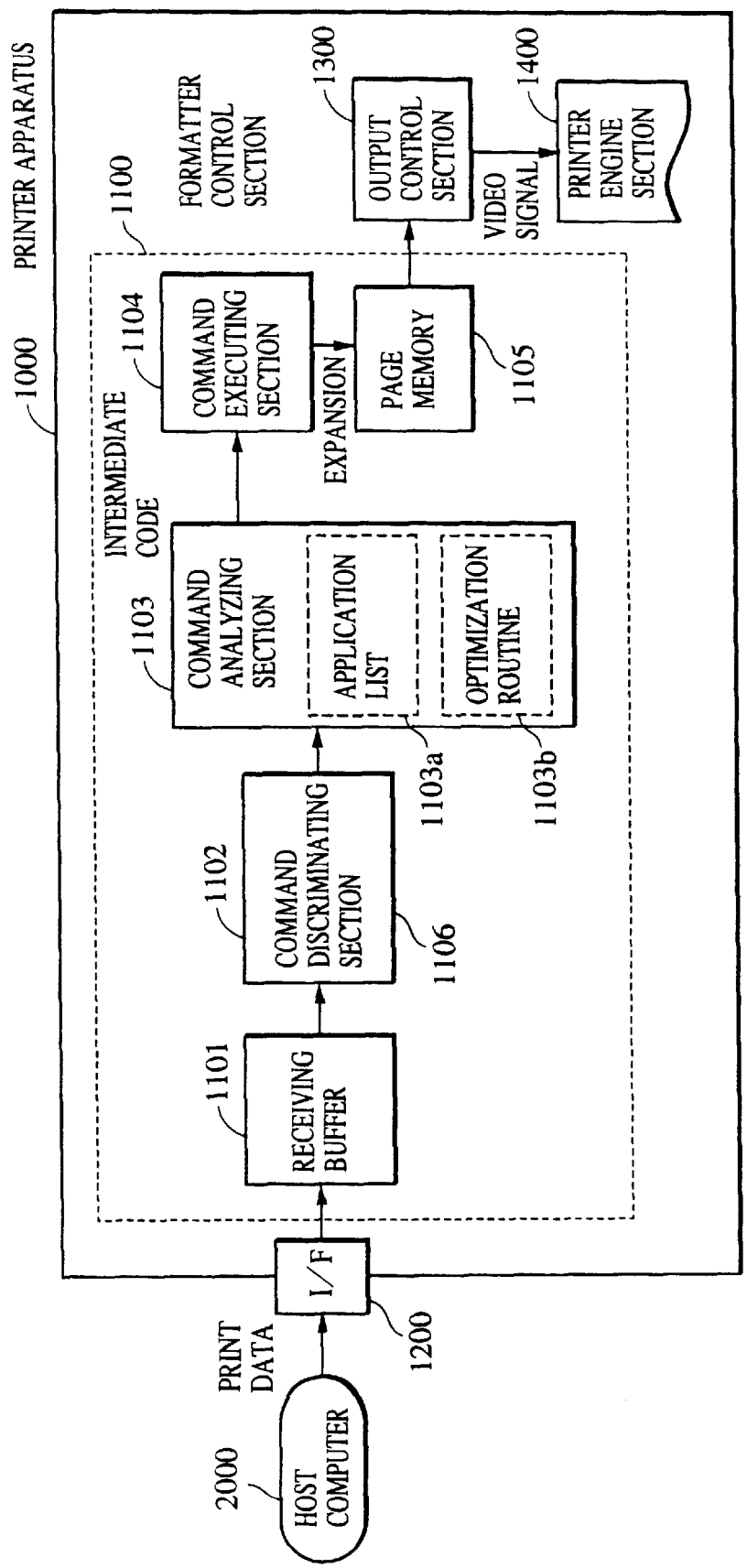
FIG. 2 is a block diagram showing the fundamental construction of a printer apparatus according to Embodiment 1.

FIG. 2 is a block diagram showing the construction of software of LBP 1000 (especially of the control unit 1001) according to the present embodiment. Referring to FIG. 2, a host computer 2000 is connected to the printer apparatus 1000 and outputs to the printer apparatus 1000 a print information consisting of print data and control code. The printer apparatus 1000 is generally constituted by a formatter control section 1100 (provided within the above described control unit 1001), interface 1200, output control section 1300, and printer engine section 1400. The formatter control section 1100 comprises a receiving buffer 1101, a command discriminating section 1102, a command analyzing section 1103, a command executing section 1104, a page memory 1105, and a data format determining section 1106. Further, the command analyzing section 1103 includes an application list 1103a and optimization routine 1103b. The receiving buffer 1101 is a storage means for temporarily retaining print information received from the host computer 2000. The command discriminating section 1102 is to perform discrimination of each print control command, and print data is analyzed at the command analyzing section 1103 in accordance with each command. The command analyzing section 1103 is to perform analysis on each print control command. When an application name which is an application discriminating data is received at the command discriminating section 1102, the application name is sequentially compared with the application list 1103a. The application list 1103a is a table describing application names and contrast between the subject command to be optimized and an optimization routine. When the received application name exists within the application list 1103a, an analysis is made by switching the routine for analyzing commands which are the subject of optimization to a corresponding command analyzing routine in the optimization routine 1103b. The command analyzing section 1103 analyzes print information and thereby converts each print control command into the form of an intermediate code having a format which is more readily processed at the command executing section 1104. The command executing section 1104 executes processing corresponding to each command based on the intermediate code and, for those commands related to plotting and printing, sequentially expands a corresponding pattern into the page memory 1105. On the other hand, when it is determined as a simple bit map at the data format determining section 1106, the image data is expanded into the page memory 1105 as it is. It should be noted that the formatter control section 1100 is generally constructed by a computer system using CPU, ROM, RAM, etc. The output control section 1300 converts the content of the page memory 1105 into a video signal and transmits it to the printer engine section 1400. The printer engine section 1400 is the section of printing mechanism for forming the received video signal into a permanent visible image on the recording paper.

The total print control processing procedure in the present embodiment with the printer apparatus constructed as the above will be described below with reference to flowcharts shown in FIGS. 3 and 4. The respective processing steps are indicated by S301 to S308 in FIG. 3 and S401 to S408 in FIG. 4.

Figure 3:
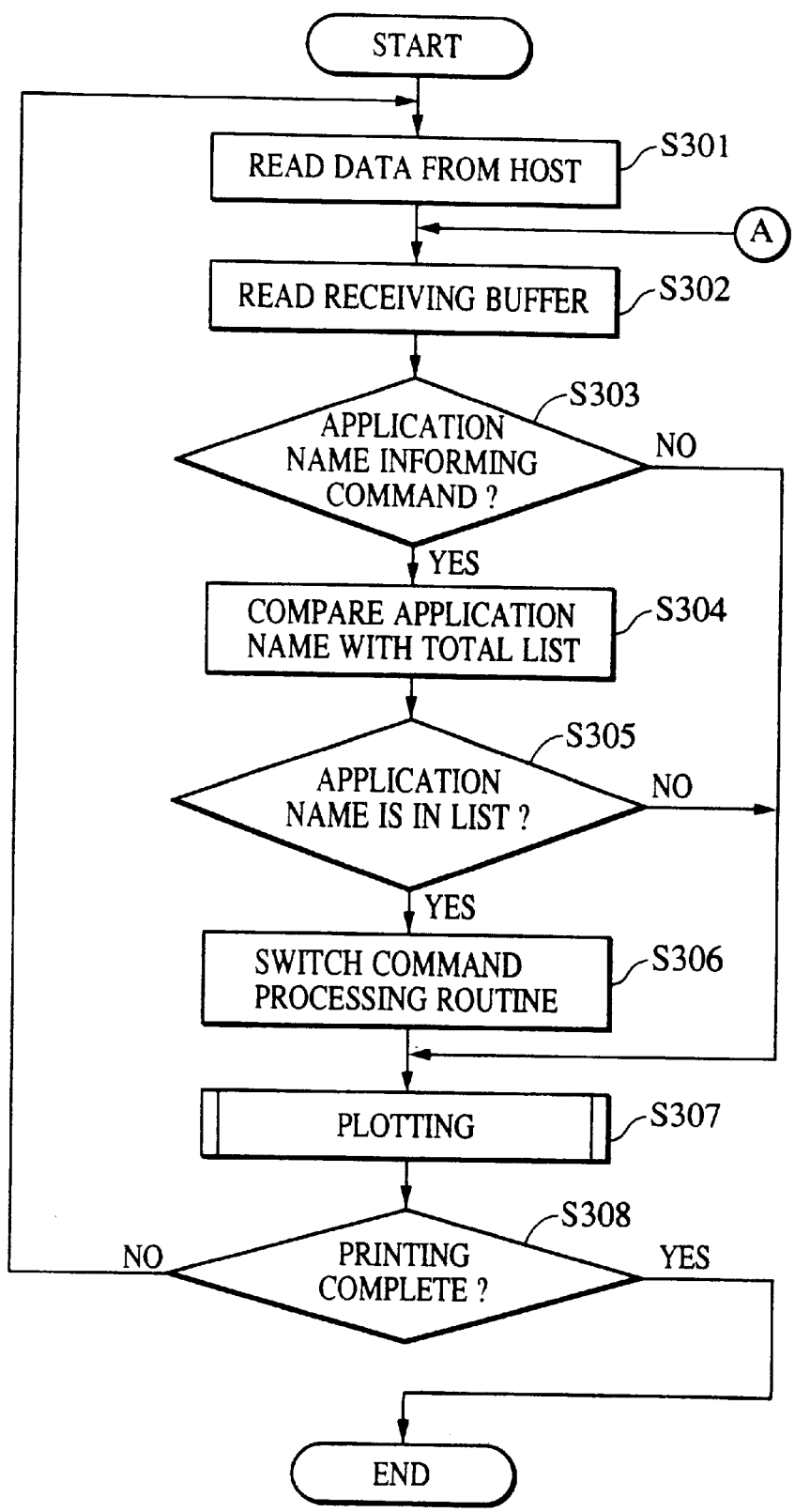
FIG. 3 is a flowchart of print control procedure of Embodiment 1.

FIG. 3 shows the main processing from start to end of operation of the printer apparatus 1000. First, at step S301, print data sent from the host computer 2000 is received and is stocked up in the receiving buffer 1101. Next, the print data stocked in the receiving buffer is read at step S302 and, at step S303, it is determined at the command discriminating section 1102 whether or not the print control command is an application name informing command. If it is an application name informing command, the system proceeds to step S304 where the received application name is sequentially compared with the application list 1103a. It is then determined at step S305 whether or not a corresponding application name exists in the application list. If exists, the command analyzing routine for comparison is switched to an optimization routine at step S306, and the system proceeds to plotting process of step S307. On the other hand, when the command received at step S303 is not an application name informing command or when the application name received at step S305 does not exist in the application list, the system directly proceeds to step S307 where plotting is performed, and it is then determined at step S308 whether a print terminating command (job terminating command) has been received or not or whether print data has ended or not. If it is an end of printing, the printing operation is terminated. If not an end of printing, processing of step S301 and after is repeated.

Figure 4:
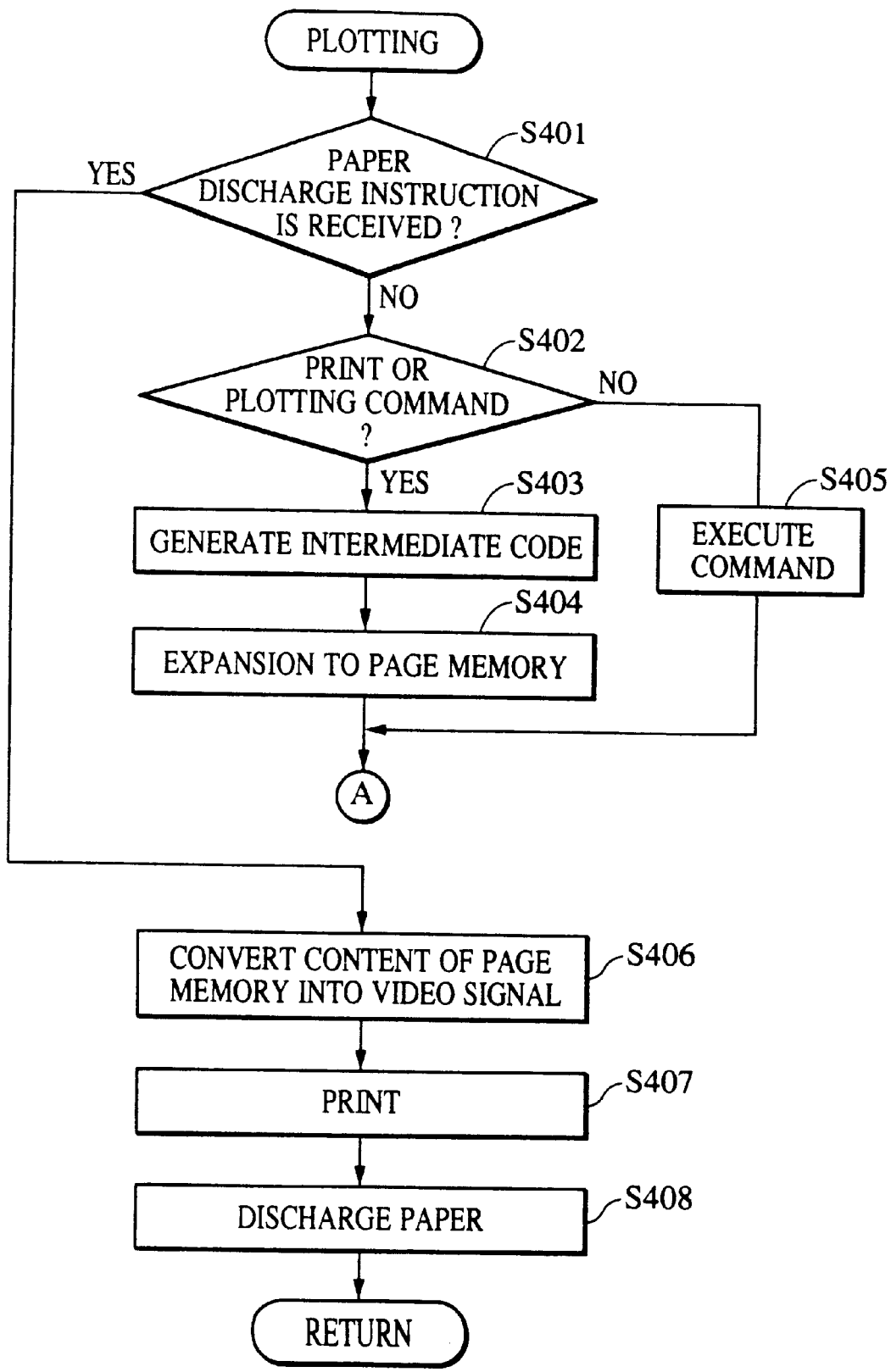
FIG. 4 is a flowchart of the procedure of plotting shown in FIG. 3.

FIG. 4 explains plotting process (S307) as used in FIG. 3. First, at step S401, it is checked at the command analyzing section 1103 whether data is a paper discharge instruction or not and, if a paper discharge command, the system proceeds to step S406 to perform a corresponding processing. Further, when it is not a paper discharge command at step S401, it is then determined whether or not the analyzed command is a command for expansion to the page memory such as character printing or graphic plotting (step S402) and, if not, the system proceeds to step S405 where processing corresponding to such command is executed. If the system proceeds to step S403 from step S402, an intermediate code in a form more readily processed by executing commands is generated. Upon receiving the intermediate code, an expansion processing to the page memory 1105 is performed at the command executing section 1104 (step S404), and, after completion of expansion processing with respect to one print or plotting command, the system returns to step S302 of FIG. 3 where data analyzing process is repeated. If it is determined as a paper discharge instruction at step S401, the content of the page memory 1105 is output as an image transfer by converting it into a video signal for the printer engine section 1400 at the output control section 1300 (step S406). At the printer engine section 1400, printing is performed by forming the received video signal into a permanent visible image on the recording paper (step S407). The print control processing for one page is then terminated when the printed result is discharged at step S408.

While the actions of the printer apparatus as a whole have been described, these are the processing accomplished mainly by the computer system of the formatter control section 1100.

Embodiment 2

Figure 5:
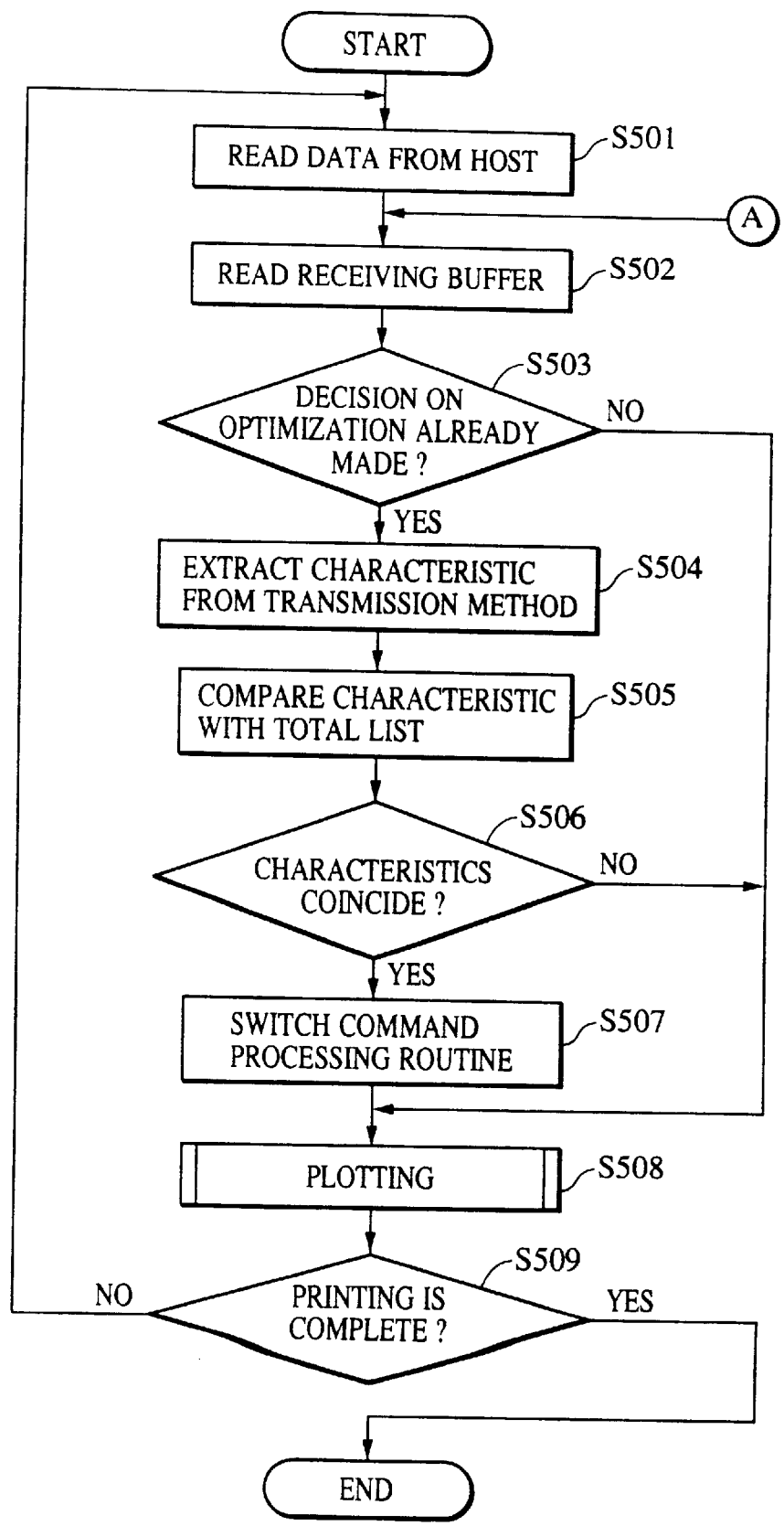
FIG. 5 is a block diagram showing the fundamental construction of a printer apparatus according to Embodiment 2.
Figure 6A:
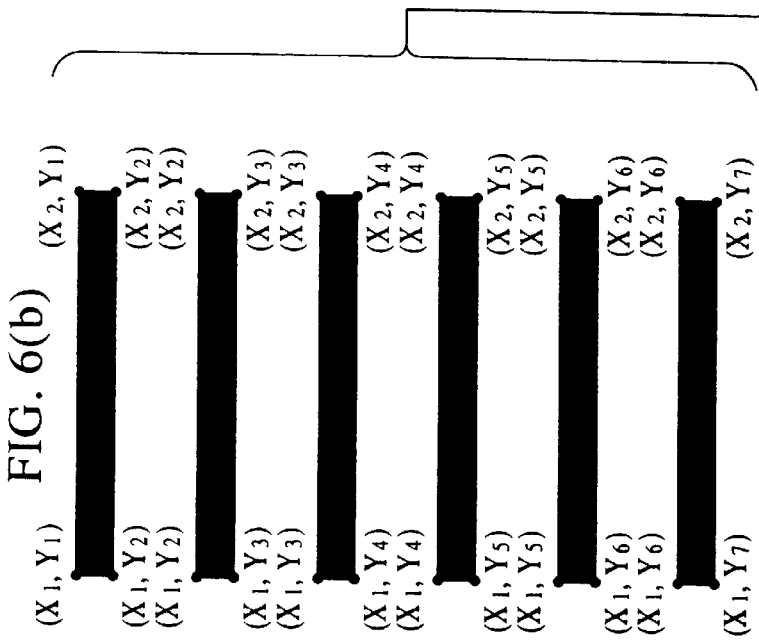
FIG. 6 illustrates an example of plotting data optimization according to an embodiment.
Figure 6B:
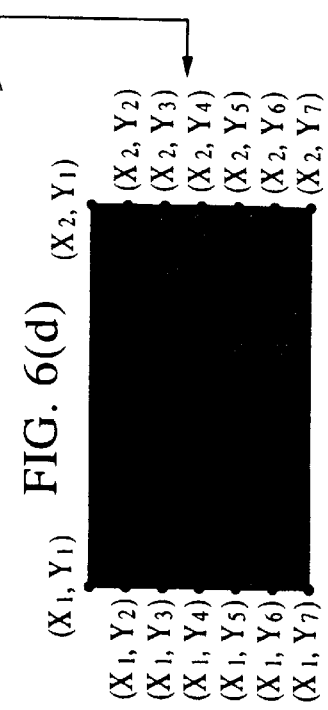
Figure 6C:
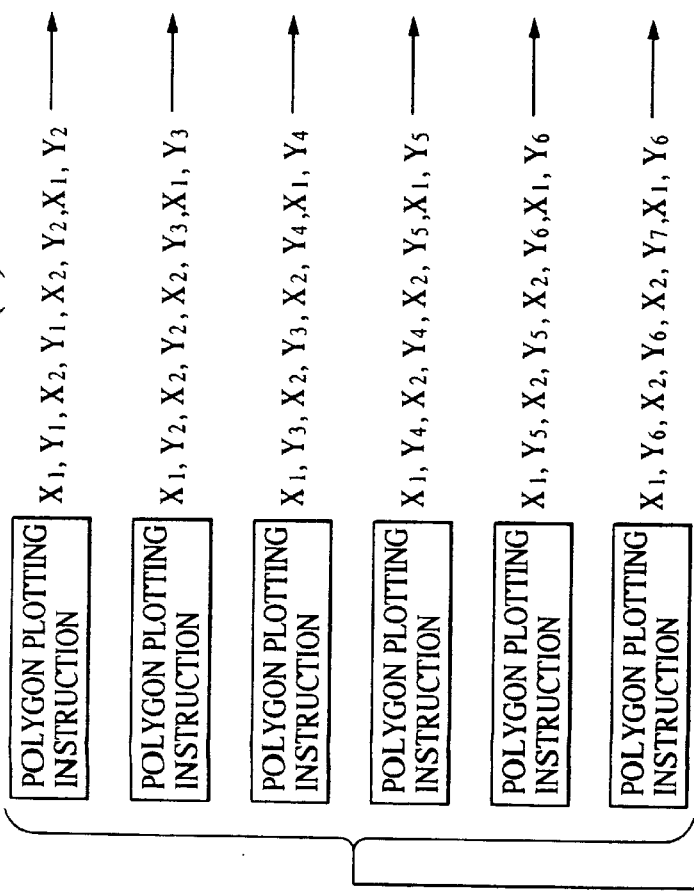
Figure 6D:

FIG. 5 shows the main processing from start to end of operation of the printer apparatus 1000 of this embodiment. The respective processing steps are indicated by S501 to S509 in FIG. 5. Note that the plotting process in FIG. 5 is similar to that of Embodiment 1 and will not be described.

First, at step S501, print data sent from the host computer 2000 is received and stocked in the receiving buffer 1101. Next, a command chain stocked in the receiving buffer is read out at step S502 and it is determined at step S503 whether a determination on command optimization has been made or not. If a determination on optimization has not yet been made, a characteristic is extracted from the transmitting method of the command chain at step S504. In particular, it is for example a correlation between the respective commands of coordinate parameters, area size, etc. The characteristics extracted at step S505 are then sequentially compared with a list of table corresponding to the application list of Embodiment 1, and it is determined at step S506 whether a matching characteristic exists in the list. If there is a matching characteristic at step S506, the system proceeds to step S507. At step S507, the command processing routine corresponding to the list is switched to the optimization routine and the system then proceeds to plotting process of step S508. On the other hand, when a determination on optimization has already been made at step S503 or when a list with a matching characteristic is not found at step S506, the system directly proceeds to step S508 where plotting is performed and it is then determined at step S509 whether a print terminating instruction has been received or not or whether print data has ended or not. If it is an end of print, the printing operation is terminated. If not an end of print, processing of step S501 and after is repeated.

FIGS. 6 and 7 show an example of optimization of plotting process by the optimization routine (S306, S506). A further description of the optimization routine will be given later with reference to FIG. 12.

For example, as shown in FIG. 6, when a command chain such as one plotting polygons (rectangle) by consecutively shifting coordinates by a small amount at a time (a) has been generated by and transmitted from an application program, the respective polygons are individually plotted (b) by a conventional printer apparatus since the commands are sequentially analyzed and executed. Consequently, an image as indicated by (d) is obtained. In the present embodiment, a characteristic of transmitting by the application is previously recognized so that they are replaced by a command for plotting a single rectangle (c) through the above described optimization routine without affecting the image to be obtained at the end (d).

Further, as shown in FIG. 7, when a command chain such as one plotting the same image data at the same position again and again with changing the area to be clipped has been transmitted (a), a conventional printer apparatus effects a plotting faithfully in accordance with each command chain (b). In this embodiment, they are converted into commands (c) for plotting an image of the area to be clipped through an optimization routine without affecting the image (d) to be obtained at the end. In FIG. 7, of the area for which image data is sent by plotting instruction (the portion of rectangle formed by broken lines in the figure), actual plotting is performed only in the area specified by clipping instruction (the portion of rectangle formed by solid lines in the figure).

While, in the above described Embodiments 1 and 2, the received commands are converted through an optimization routine and then converted into an intermediate code, it is also possible to generate an optimized intermediate code from the received command or to optimize an intermediate code after converting the received command into an intermediate code.

Embodiment 3

Figure 8:
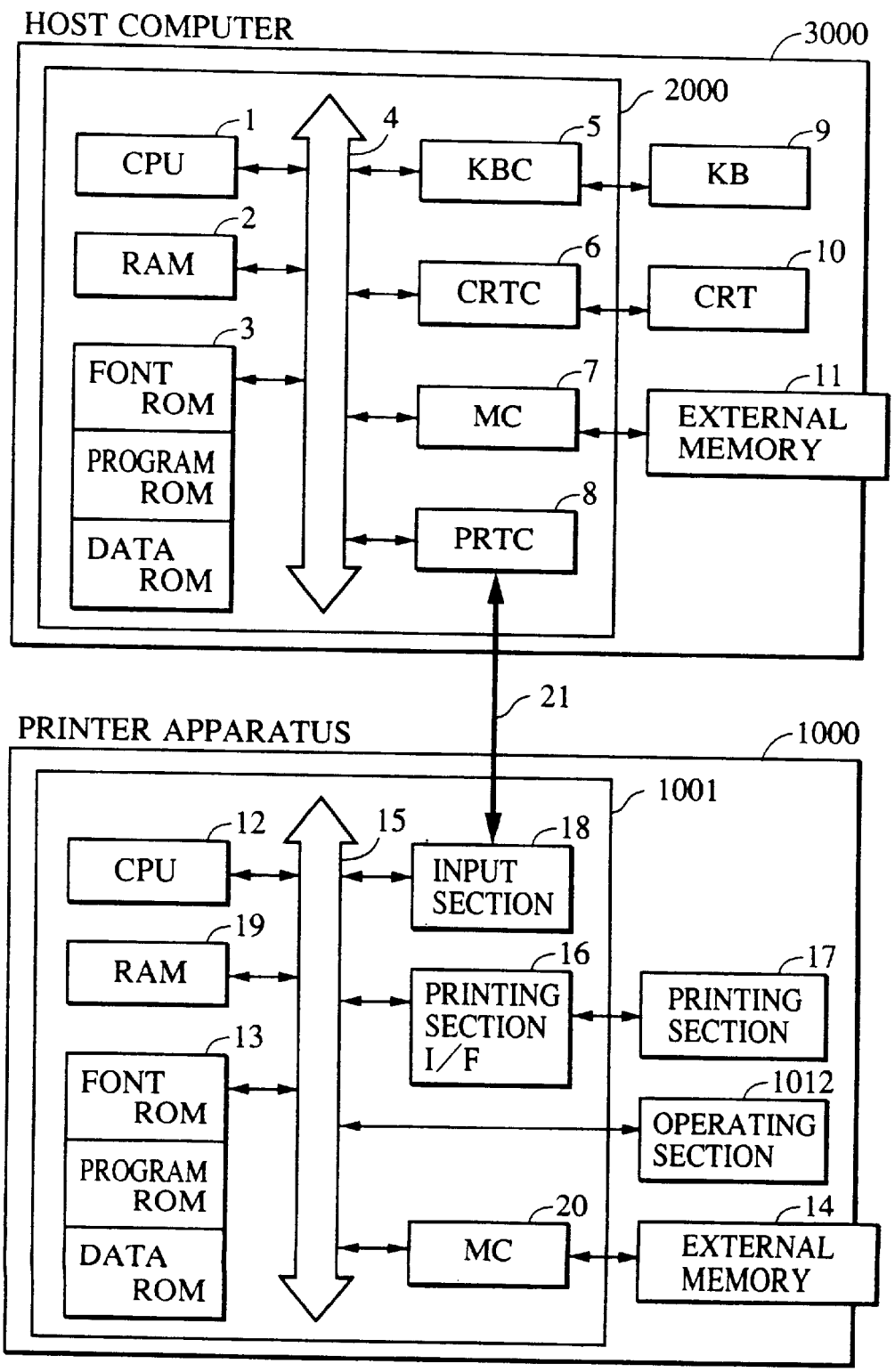
FIG. 8 is a block diagram showing the construction of a printer control system according to Embodiment 3.

FIG. 8 is a block diagram for explaining the construction of a printer control system showing Embodiment 3 of the present invention. Here, a description will be given below using the laser beam printer (FIG. 1) as an example. Naturally, as far as the function of the present invention can be executed, the present invention may be applied to any of a single equipment, a system consisting of a plurality of equipment, or a system in which data is processed through a network such as LAN.

Referring to FIG. 8, what is denoted by numeral 3000 is a host computer, which includes a CPU 1 for executing a document processing where pattern, image, character, table (including listing or the like), etc., are mixed based on a document processing program stored in a program ROM of ROM 3, the CPU 1 generally controlling the devices connected to a system bus 4. The program ROM of the ROM 3 stores a control program or the like of CPU 1, font ROM of the ROM 3 stores font data or the like to be used in the above document processing, and data ROM of the ROM 3 stores various data to be used in performing the above document processing, etc. RAM 2 functions as a main memory of CPU 1, work area, etc. A keyboard controller (KBC) 5 controls key input from a keyboard 9 or a pointing device (not shown). A CRT controller (CRTC) 6 controls display on a CRT display (CRT) 10. Memory controller (MC) 7 controls access to an external memory 11 such as a hard disk (HD) or floppy disk (FD) for storing a boot program, various applications, font data, user file, edit file, etc. A printer controller (PRTC) 8 is connected to a printer 1000 through a predetermined bidirectional interface 21 to execute communication control processing with the printer 1000. It should be noted that the CPU 1 executes expansion (rasterize) processing of outline font onto a display information RAM provided for example on RAM 2 so as to make WYSIWYG on the CRT 10 possible. Further, the CPU 1 opens various windows entered based on commands directed by a mouse cursor or the like (not shown) on the CRT 10 to execute various data processing. In the printer 1000, a printer CPU 12 generally controls access with various devices connected to a system bus 15 based for example on a control program stored in the program ROM of ROM 13 or a control program stored in an external memory 14 and outputs an image signal as an output information to a printing section (printer engine) 17 which is connected thereto through a printing section interface 16.

Further, a control program or the like of CPU 12 as shown in a flowchart of Embodiment 1 or 2 can be stored to the program ROM of ROM 13.

Font data or the like to be used in generating the above output information is stored to the font ROM of ROM 13, and, in the case of a printer without the external memory 14 such as a hard disk, information or the like for use on the host computer is stored to the data ROM of ROM 13. CPU 12 is capable of communication processing with the host computer through an input section 18 and is constructed so that information or the like within the printer can be given to the host computer 300. What is denoted by numeral 19 is a RAM which functions as a main memory, work area, etc. of CPU 12 and is constructed so that memory capacity thereof can be extended by an optional RAM connected to an extension port (not shown). It should be noted that the RAM 19 is used for example as an output information expansion area, environment data storage area, NVRAM, etc. Access to the external memory 14 such as the above described hard disk (HD) or IC card is controlled by a memory controller (MC) 20. The external memory 14 is connected as an option and stores font data, emulation program, form data, etc. What is denoted by numeral 18 is the above described operation panel and has switches for operation and LED display indicator, etc., disposed thereon. The number of the above described external memory is not limited to one. At least one unit is provided and it may also be constructed such that a plurality of optional font card in addition to internal font or of external memory for storing program to interpret a printer control language of a different language system can be connected thereto. Furthermore, an NVRAM (not shown) may also be provided so as to store a printer mode setting information from the operation panel 1012.

Figure 9A:
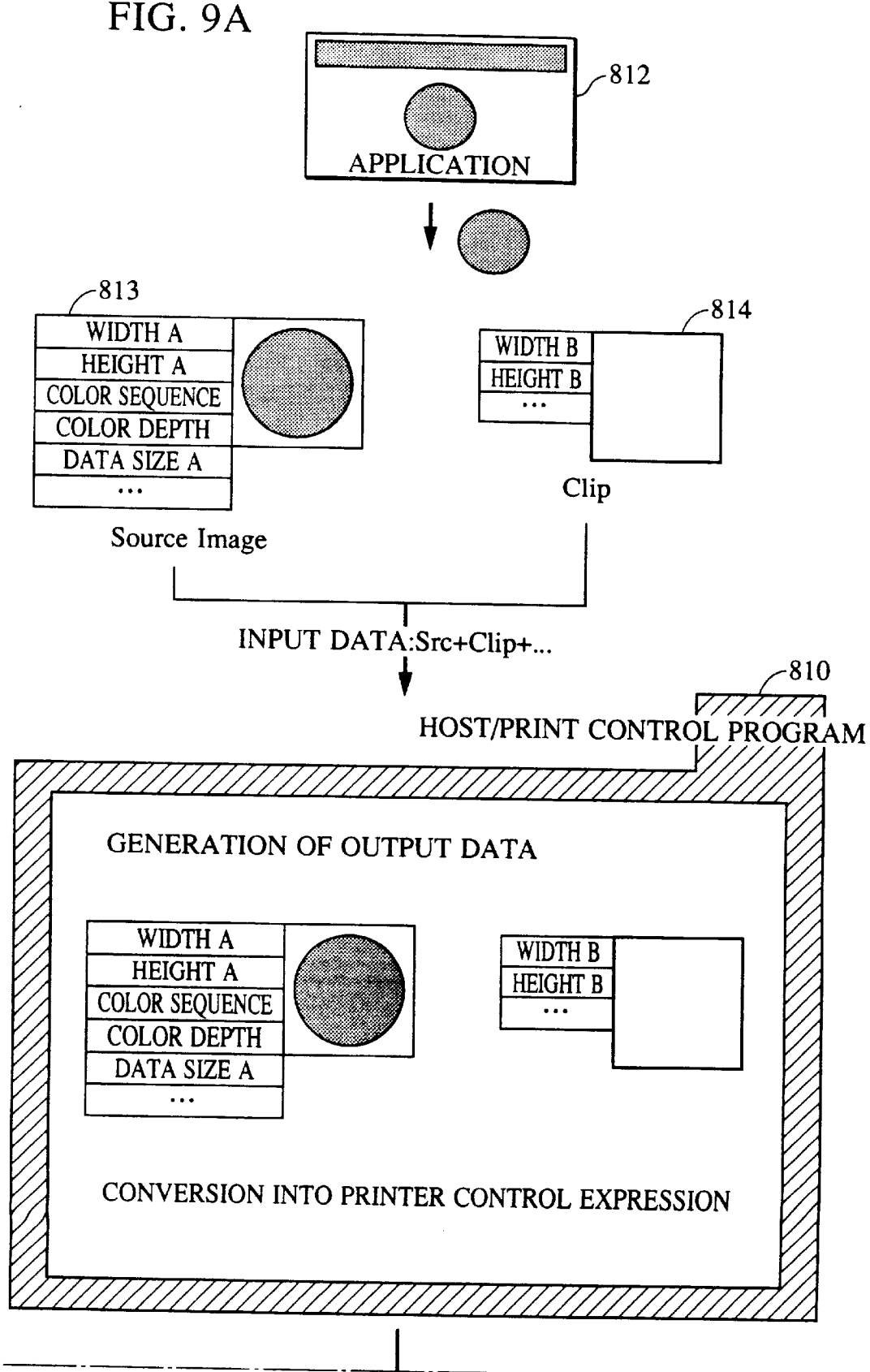
FIG. 9 schematically illustrates an image print processing.
Figure 9:
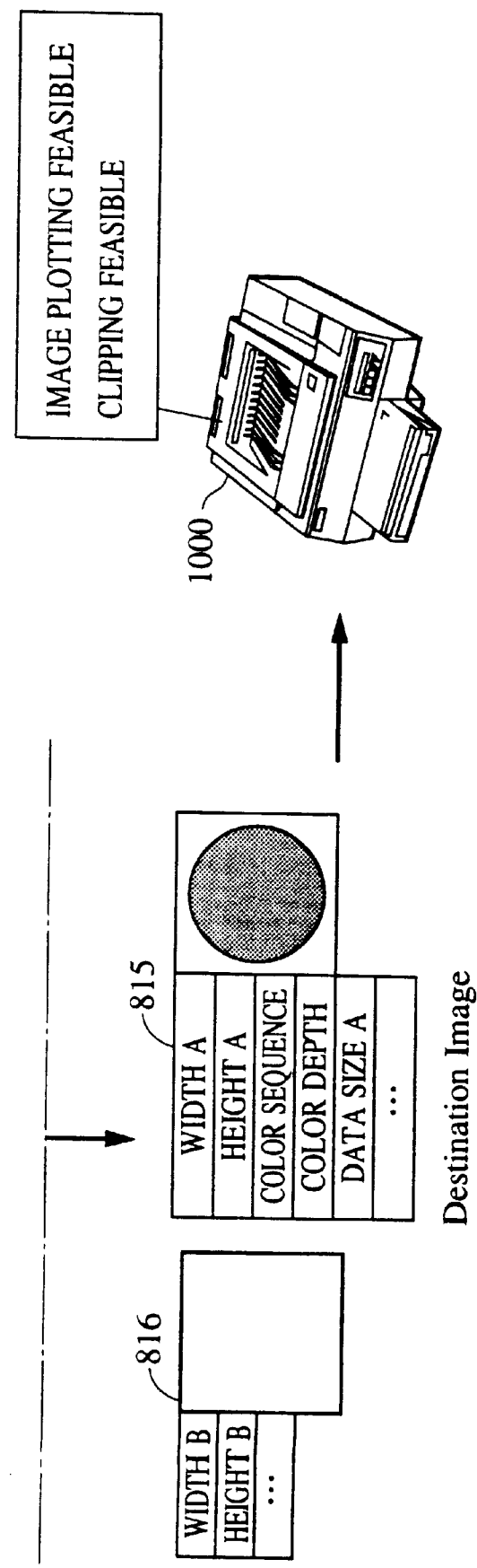

Next, in a printing system constructed as the above, FIG. 9 summarizes an ordinary image print processing. The printer 1000 is capable of both plotting and clipping an image. An example is shown here of the case where printing of an image from an application program of a host computer is effected with such printer 1000. First, an output object represented for example by an image plotting command 813 or clipping command 814 from the application is delivered. A host/print control program (printer driver) 810 converts the object into a control representation of the printer. The printer driver 810 is provided by FD or the like or stored in HD in advance. Since, as described above, the printer 811 is capable of both image plotting and clipping, the image plotting command 813 or clipping command 814 requested for printing by the application 812 is transmitted to the printer in a manner converted into an image plotting command 815 or clip command 816 of a control representation of the printer. Printing is then effected at the printer 1000.

In this embodiment, the optimization of plotting process in Embodiment 1 and Embodiment 2 is performed on the host computer side in accordance with the printer driver 810. The print control processing procedure as a whole in the present embodiment will now be described with reference to the flowchart shown in FIG. 10. The respective processing steps are indicated by S801 to S808 in FIG. 10.

Figure 10:
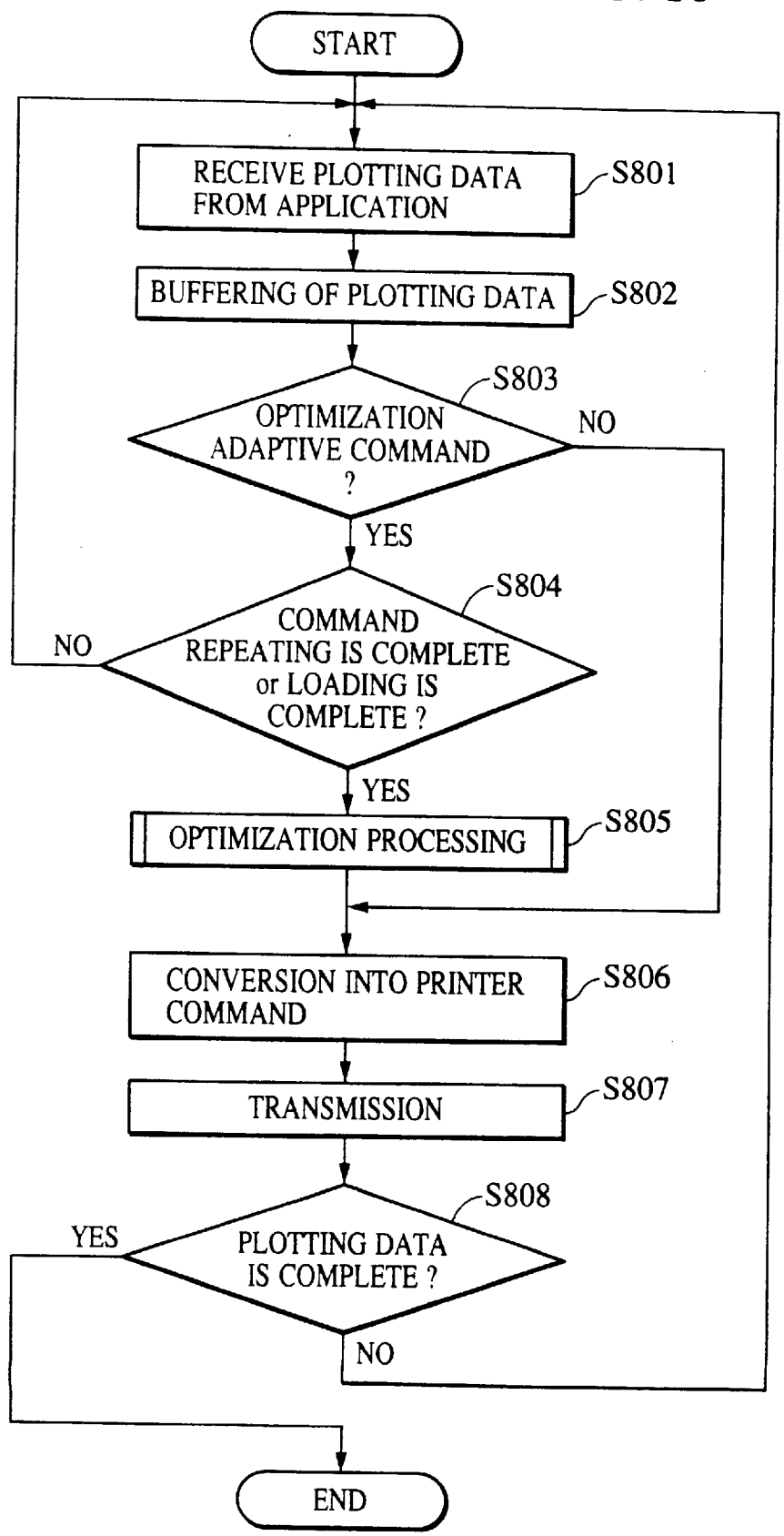
FIG. 10 is a flowchart showing a print control procedure according to Embodiment 3.

FIG. 10 shows main processing from start to end of printing of the host computer 3000. First, at step S801, plotting data is received from an application program, and the plotting data is first buffered at step S802. Next, it is determined at step S803 whether or not the data is of the kind to which an optimization should be applied. If determined as the kind of data to be optimized, it is further determined at step S804 whether repetition of the same command chain has been terminated or not and whether buffering has been repeated up to a threshold or not. If negative results are obtained for the both, processing of step S801 and after is repeated. If repetition of the same command chain has been terminated or if buffering has been repeated up to a threshold at step S804, optimization processing is performed at step S805. The optimization processing will be described later. Thereafter, the optimized data is converted into a printer command at step S806. On the other hand, if it is determined at step S803 not as data to which an optimization should be applied, the system directly proceeds to step S806 where data is converted into printer command and it is then transmitted to a printer apparatus at step S807. Thereafter, the system proceeds to step S808 where it is determined whether plotting data from application has ended. If an end of plotting data, plotting is terminated. If not an end of plotting data, the system returns to step S801 and processing is repeated accordingly.

Figure 11A:
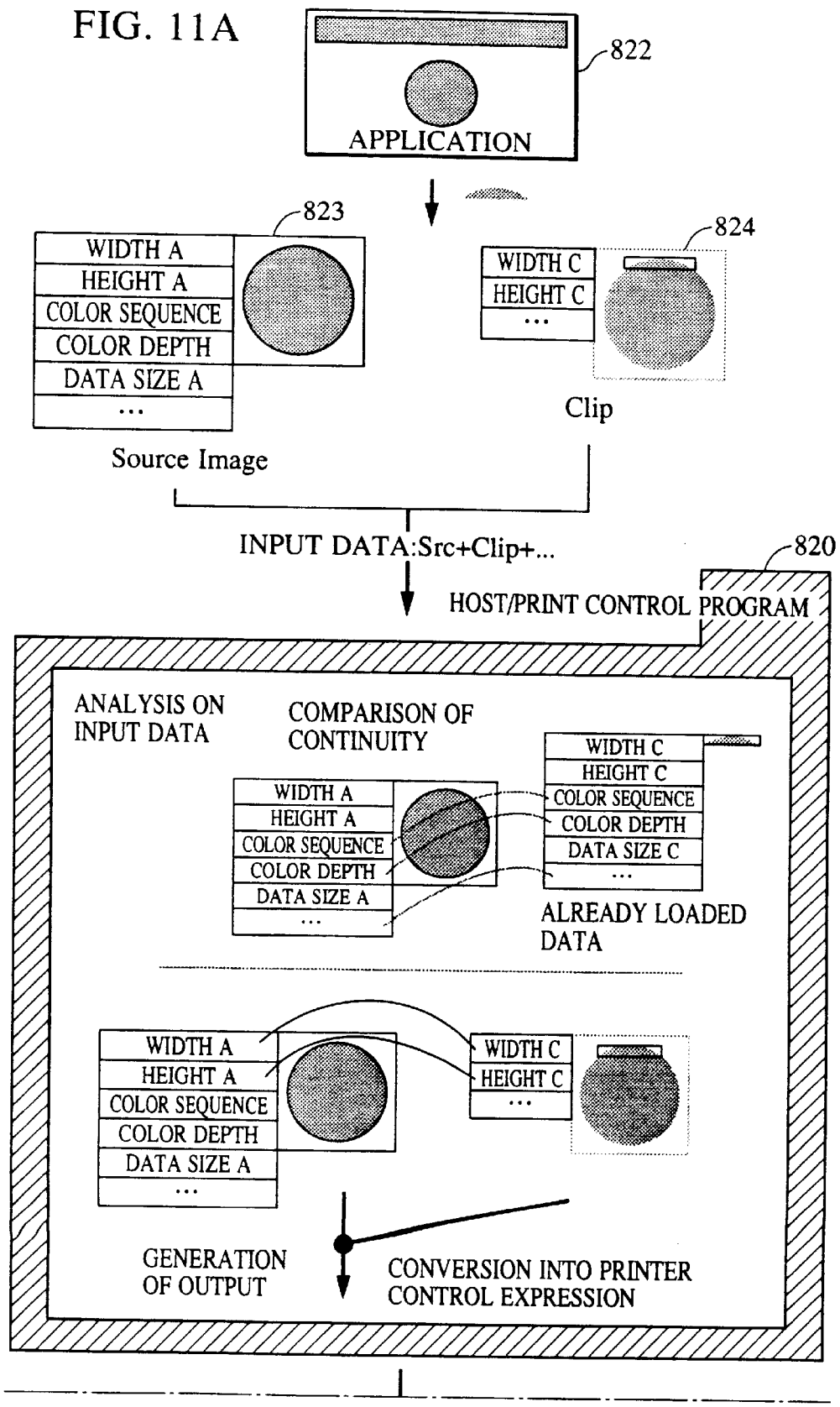
FIG. 11 schematically illustrates an image print processing characteristic of the present invention.
Figures 11, 11B:
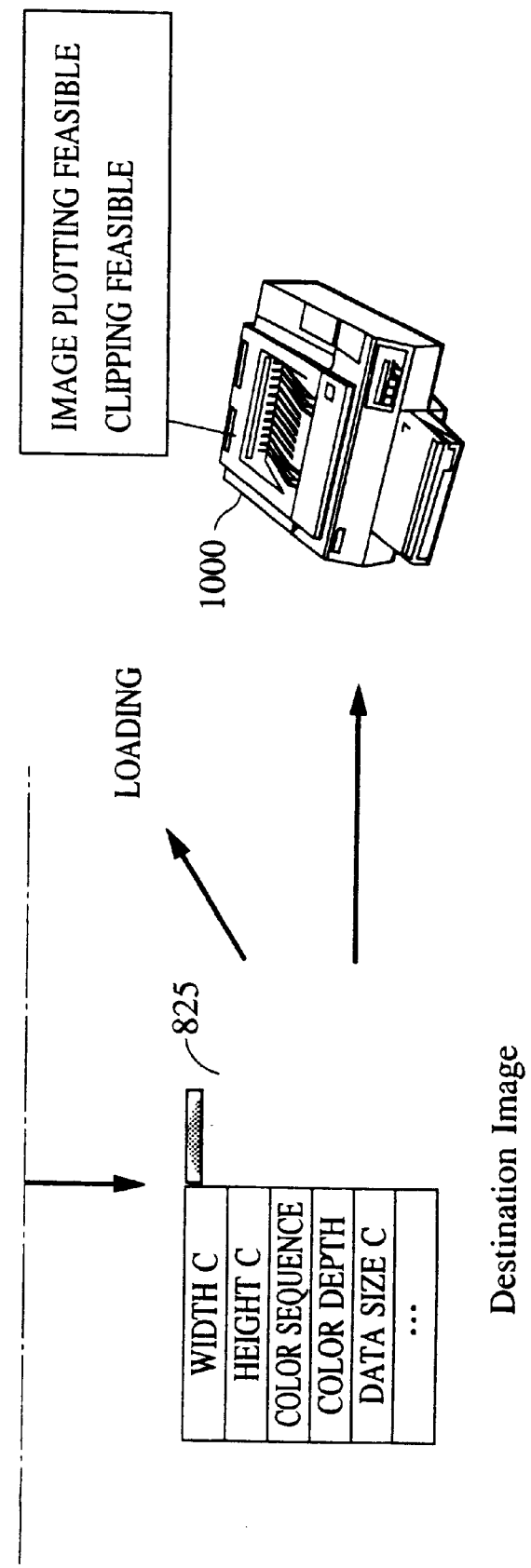
Figure 12B:
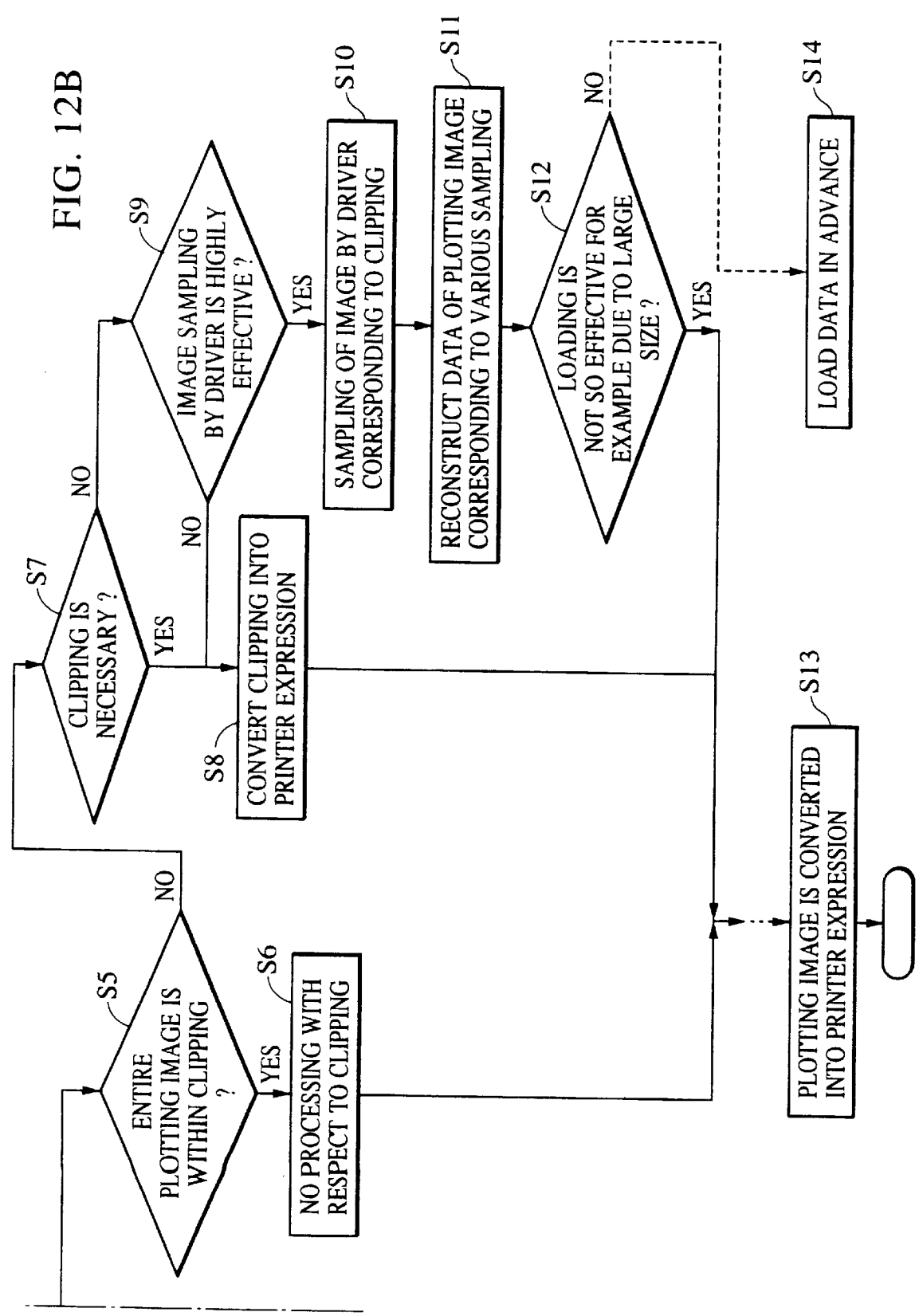
FIG. 12 is a flowchart of an example of optimization processing.

Next, a generalized example of optimization in an image print processing is shown in FIG. 11 and a flowchart thereof is shown in FIG. 12.

Similarly to FIG. 9, the printer 1000 is capable of both plotting and clipping of an image. An example is shown here of the case where printing of an image is effected with such printer 1000 from an application 822 of a host computer. First, upon a request for printing an image from an application, an output object represented such as by an image plotting command 823 or clip command 824 is delivered. The host/print control program (printer driver) 810 converts the object into a control expression of the printer. In the case shown in FIG. 11, the clipping area of the clip command 824 corresponds to only a small portion of the image plotting area of the image plotting command 823. The host/print control program 810 makes a comparison of attributes between the plotting image and the clip object and is capable of determining that the clip is significantly smaller as shown in the figure. In this case, if a method is employed of effecting clipping at the computer and then plotting a plotting image, most of the plotting image data do not affect the plotting result but are to be transmitted to the printer 1000. Then, at the time of conversion into printer control expression, only the area corresponding to the clip is extracted from the image and conversion into control expression of the printer is effected in such a manner as to replace those of large width by those of clip. Further, conversion into a printer control expression is not immediately performed at this point; an extraction of the image is performed so as to retain it as it is in the form of input data. A comparison of continuity is made at a point in time when this output routine is next called (pallet, color depth, plotting position, etc.). If there is no continuity, it is output as converted into a printer control expression. If there is a continuity, however, loading is repeated. As a result, a plotting image 825 in the form of printer control expression is obtained. The clipping object is not directly converted into a printer control expression.

While, in Embodiment 1, an application name is transmitted to the printer apparatus, a different signal may be used as far as it is a type of trigger capable of switching processing.

Further, in Embodiment 1, a table is internally provided to previously retain as an information on the characteristics of data transmission of a plurality of application programs. If, however, the number of targeted applications is small, it is also possible to determine whether an optimization should be effected or not without having a table.

Similarly, while, in Embodiment 2, the characteristics of command chain are provided in a table, it is also possible to make a decision on an optimization without using a table.

In Embodiment 3, an optimization is treated as a single operation when command chains are being repeated. In the case where the application name is previously known, however, it is also possible to buffer a plurality of command chains according to the characteristic of the application to perform a plurality of optimization processing.

As has been described above, according to the present invention, a redundant print data is optimized according to the characteristics of the print data so that an efficient plotting process is achieved and a high speed printing becomes possible. Further, since memory required by the printer apparatus can be saved, an impossibility of plotting due to memory shortage can be prevented and it is possible to lower the product cost.

What is claimed is:

1. An image processing apparatus as a host computer for processing output data generated for image output by an application, said image processing apparatus comprising:

conversion means for converting a plotting data instruction generated by an application into an expressing data command that is analyzable in a printer apparatus;

selection control means for, when the plotting data instruction is capable of being converted into any of a plurality of expressing data commands, selecting an optimum expressing data command from the plurality of expressing data commands and converting the plotting data instruction into the optimum expressing data command; and output control means for outputting the expressing data command to the printer apparatus, wherein the selection of one of the plurality of expressing data commands affects a processing efficiency of said printer apparatus without affecting a resulting processed data.

2. An apparatus according to claim 1, wherein the plotting data instruction is a plotting instruction of image data, and when the plotting data instruction indicates that the image data is clipped, said selection control means selects an expressing data command which plots the image data of a clipping area.

3. An apparatus according to claim 1, wherein when the plotting data instruction is capable of being converted into any of the plurality of expressing data commands, said selection control means selects an expressing data command having a smallest data size from the plurality of expressing data commands.

4. An apparatus according to claim 1, wherein when a plurality of plotting data instructions are generated by said application to define a continuous plot, said conversion means first merges the plurality of plotting data instructions into merged plotting data instructions that do not define a continuous plot and then converts the merged plotting data instructions into the optimum expressing data command.

5. An image processing method performable by a host computer of processing output data generated for image output by an application, said image processing method comprising:

a converting step of converting a plotting data instruction generated by an application into an expressing data command that is analyzable in a printer apparatus;

a selection control step of, when the plotting data instruction is capable of being converted into any of a plurality of expressing data commands, selecting an optimum expressing data command from the plurality of expressing data commands and converting the plotting data instruction into the optimum expressing data command; and output control means for outputting the expressing data command to the printer apparatus, wherein the selection of one of the plurality of expressing data commands affects a processing efficiency of said printer apparatus without affecting a resulting processed data.

6. A method according to claim 5, wherein the plotting data instruction is a plotting instruction of image data, and when the plotting data instruction indicates that the image data is clipped, said selection control step comprises selecting an expressing data command which plots the image data of a clipping area.

7. A method according to claim 5, wherein when the plotting data instruction is capable of being converted into any of the plurality of expressing data commands, said selection control step comprises selecting an expressing data command having a smallest data size from the plurality of expressing data commands.

8. A method according to claim 5, wherein when a plurality of plotting data instructions are generated by said application to define a continuous plot, said converting step comprises first merging the plurality of plotting data instructions into merged plotting data instructions that do not define a continuous plot and then converting the merged plotting data instructions into the optimum expressing data command.

9. A computer readable storage medium storing a printer driver program for causing a programmable apparatus to perform an image processing method of processing output data generated for image output by an application on a host computer, said printer driver program comprising:

converting program code for converting a plotting data instruction generated by an application into an expressing data command which is analyzable in a printer apparatus;

selection control program code for, when the plotting data instruction is capable of being converted into any of a plurality of expressing data commands, selecting an optimum expressing data command from the plurality of expressing data commands and converting the plotting data instruction into the optimum expressing data command; and output control program code for outputting the expressing data command to the printer apparatus, wherein the selection of one of the plurality of expressing data commands affects a processing efficiency of said printer apparatus without affecting a resulting processed data.

10. A medium according to claim 9, wherein the plotting data instruction is a plotting instruction of image data, and when the plotting data instruction indicates that the image data is clipped, said selection control program code selects an expressing data command which plots the image data of a clipping area.

11. A medium according to claim 9, wherein when the plotting data instruction is capable of being converted into any of the plurality of expressing data commands, said selection control program code selects an expressing data command having a smallest data size from the plurality of expressing data commands.

12. A medium according to claim 9, wherein when a plurality of plotting data instructions are generated by said application to define a continuous plot, said converting program code first merges the plurality of plotting data instructions into merged plotting data instructions that do not define a continuous plot and then converts the merged plotting data instructions into the optimum expressing data command.

13. A printer driver program for causing a programmable apparatus to perform an image processing method of processing output data generated for image output by an application on a host computer, said printer driver program comprising:

converting program code for converting a plotting data instruction generated by an application into an expressing data command which is analyzable in a printer apparatus;

selection control program code for, when the plotting data instruction is capable of being converted into any of a plurality of expressing data commands, selecting an optimum expressing data command from the plurality of expressing data commands and converting the plotting data instruction into the optimum expressing data command; and output control program code for outputting the expressing data command to the printer apparatus, wherein the selection of one of the plurality of expressing data commands affects a processing efficiency of said printer apparatus without affecting a resulting processed data.

14. A program according to claim 13, wherein the plotting data instruction is a plotting instruction of image data, and when the plotting data instruction indicates that the image data is clipped, said selection control program code selects an expressing data command which plots the image data of a clipping area.

15. A program according to claim 13, wherein when the plotting data instruction is capable of being converted into any of the plurality of expressing data commands, said selection control program code selects an expressing data command having a smallest data size from the plurality of expressing data commands.

16. A program according to claim 13, wherein when a plurality of plotting data instructions are generated by said application to define a continuous plot, said converting program code first merges the plurality of plotting data instructions into merged plotting data instructions that do not define a continuous plot and then converts the merged plotting data instructions into the optimum expressing data command.

* * * * *